United States Patent

Russo et al.

[15] 3,675,093
[45] July 4, 1972

[54] VARIABLE CAPACITOR

[72] Inventors: Paul Russo, Franklin Square; Markus Mowogrozki, New York, both of N.Y.

[73] Assignee: Polyflon Corporation, New Rochelle, N.Y.

[22] Filed: Feb. 1, 1971

[21] Appl. No.: 111,567

[52] U.S. Cl. .......................317/249 R, 317/249 T, 317/251
[51] Int. Cl. .........................................................H01g 5/04
[58] Field of Search ...............317/249 R, 249 T, 249 D, 251; 204/30

[56] References Cited

UNITED STATES PATENTS

| 2,219,921 | 10/1940 | Gerth | 317/249 D |
| 2,904,845 | 9/1959 | Sperry | 317/249 T |
| 2,910,635 | 10/1959 | Abrams | 317/249 T |
| 3,027,504 | 3/1962 | Clark | 317/249 T |
| 3,167,491 | 1/1965 | Harrison | 204/30 |

FOREIGN PATENTS OR APPLICATIONS

| 560,372 | 3/1944 | Great Britain | 317/249 R |
| 726,576 | 3/1955 | Great Britain | 317/249 R |
| 665,305 | 10/1942 | Norway | 317/251 |

*Primary Examiner*—E. A. Goldberg
*Attorney*—Ward, McElhannon, Brooks & Fitzpatrick

[57] ABSTRACT

The invention relates to variable capacitors suitable for high frequency, high voltage, low loss applications.

The capacitor is formed of at least two sections or elements which are relatively movable to achieve selective capacitance variation. The capacitor sections or elements each comprise a metallic layer, serving as an electrode, secured to a layer of dielectric material with the layers of dielectric material being of generally equal thickness and in contiguous slidable contact to form the variable capacitor.

7 Claims, 5 Drawing Figures

PATENTED JUL 4 1972

INVENTOR.
PAUL RUSSO
MARCUS NOWOGRODZKI
BY
ATTORNEYS

INVENTORS
PAUL RUSSO
BY MARCUS NOWOGRODZKI

ATTORNEYS 3,675,093

VARIABLE CAPACITOR

The present invention relates to capacitors and more particularly to variable capacitors especially suitable for high frequency, high performance applications.

Basically, capacitors are composed of two metallic elements separated by a dielectric material. In a capacitor, electric charge is stored in the dielectric material positioned between the metallic electrodes. The amount of charge storage, or the capacitance of the device, is proportional to the effective surface area of the electrodes (the projection of one of the electrodes upon the other).

In a variable capacitor, this effective area is changed, usually by moving one of the electrodes (called the rotor) with respect to the other, held stationary, called the stator. The charge density in a capacitor is not uniform. It reaches maxima at the dielectric-metal interfaces and a minimum in the center of the dielectric. Thus, when the metallic electrode is moved to achieve a variable capacitance effect as heretofore, it is moved in a region of high charge concentration. Thus, in high-voltage circuits (for example, above 1,000 volts), voltage breakdown tends to occur at this interface. Attempts to overcome this problem and to achieve variability in capacitors are illustrated in U.S. Pat. Nos. 2,219,921, 2,688,177, and 3,337,789.

Applicants have overcome the problems heretofore present in variable capacitors particularly adapted for high frequency, high voltage applications. In such applications heretofore, variable capacitors have been suitable only for limited frequency use because of the losses inherent in such capacitors. At present, high frequency applications and high voltage applications have had to employ high-vacuum capacitors. Also, when the losses in the dielectric are of importance, high vacuum is used to minimize these losses. High-vacuum capacitors are complicated, costly, and fragile, particularly in variable-capacitance geometries.

The present invention overcomes the problems previously encountered with high frequency, high performance variable capacitors by providing, in essence, a capacitor having a dielectric formed of two separate but contiguous elements with metallic layers mounted on each element with the dielectric layers of the elements therebetween. To achieve variability the dielectric elements are moved relative to each other, thereby changing the relative positions of the metallic layers. However, since the interface between the metallic layers and their associated dielectric elements is undisturbed, the problems present heretofore in variable capacitors are eliminated.

In the present invention, the effective electrode area of the variable capacitor configuration is changed by moving one-half of the capacitor with respect to the other, i.e., the surface of movement being approximately the center of the dielectric. Thus movement occurs in the region of lowest concentration of electric charge, minimizing high voltage breakdown effects.

Other objects and advantages of the invention will be set forth in part hereinafter and in part will be apparent herefrom or may be learned by practice with the invention, the same being realized and obtained by means of the instrumentalities and combinations pointed out in applicants' claims.

The invention consists in novel parts, construction, arrangements, combinations and improvements herein shown and described.

The accompanying drawings referred to and constituting a part hereof illustrate embodiments of the invention and together with the description serve to explain the principles of the invention.

Figure 1:
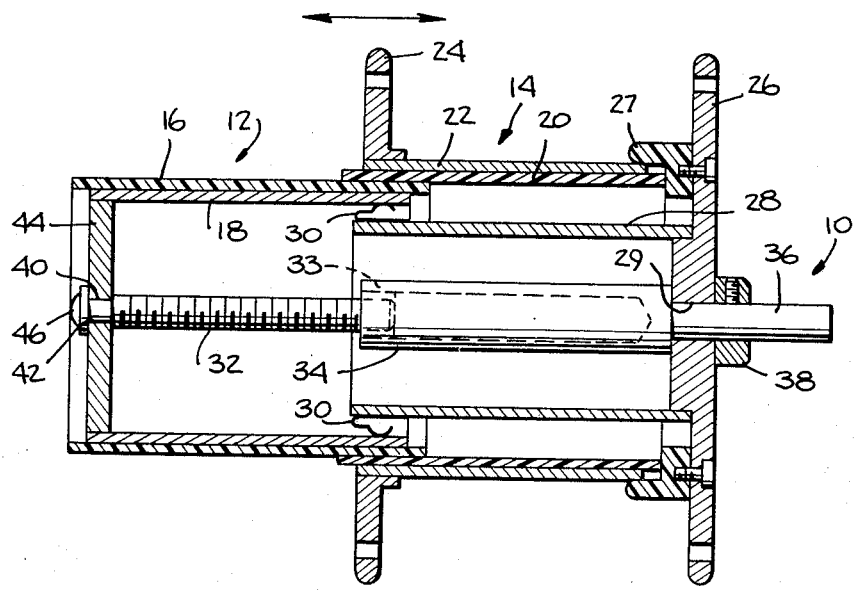
FIG. 1 is a cross-sectional view of a capacitor of the present invention shown in full extended position.
Figure 2:
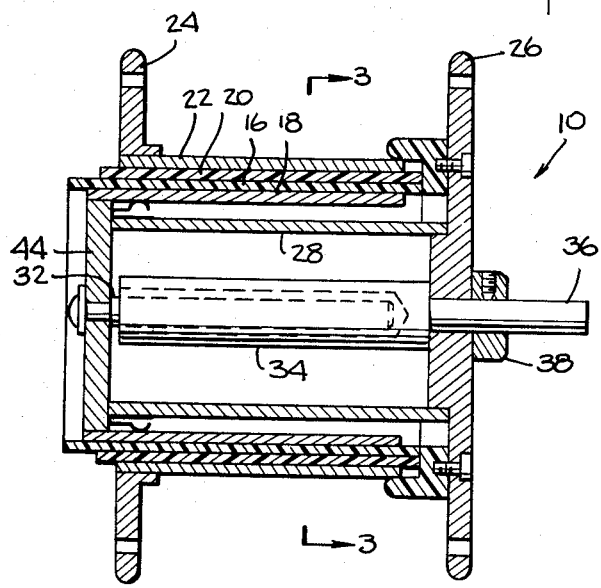
FIG. 2 is a cross-sectional view of the capacitor of FIG. 2 shown in retracted position.

Turning to the drawings and specifically to FIGS. 1 and 2, there is illustrated therein a capacitor 10 embodying one form of the present invention. Capacitor 10 includes a pair of capacitor elements 12 and 14, each comprising a dielectric layer 16 and 20 respectively, having a metallic layer 18 and 22 which serve as the capacitor electrodes. Metallic layers 18 and 20 are secured to their associated dielectric elements 16 and 20 and preferably, generally coextensive therewith. The elements 12 and 14 are illustrated as tubular or cylindrical in form, which is a preferred configuration. However, it will be understood that these elements can be of any other suitable configuration such as flat plates or disc or cup-shaped without departing from the essence of the invention.

As explained hereinabove, the capacitance of capacitor 10 is proportional to the effective surface area of the electrodes 18 and 20 and the capacitance of capacitor 10 is selectively varied by moving capacitor elements 12 and 14 relative to each other. As shown in FIG. 1, the capacitance of capacitor 10 is at its minimum since the capacitor elements 12 and 14 have been moved to their fully extended position. In FIG. 2, the capacitor elements 12 and 14 are in their fully retracted position, thus the capacitance of capacitor 10 is maximum.

Metallic layers 18 and 22 are preferably formed of copper although other suitable metals having good electrical properties, such as nickel, may be used. The dielectric layers are preferably formed of plastic material having good dielectric properties. Applicants have found that dielectric materials such as the fluorocarbons which have natural lubricity and are thus self-lubricating are also particularly desirable. The most suitable dielectric material found by applicants is polytetrafluoroethylene which is both self-lubricating and possesses excellent dielectric loss characteristics which are maintained into the microwave region of the electro-magnetic spectrum, producing variable capacitors having loss characteristics fully comparable to high-vacuum units.

Metallic layers 18 and 22 are suitably adhered to their associated dielectric layers 16 and 20 by any suitable means including adhesives and the like. However, when polytetrafluoroethylene is selected as the dielectric material it has been found that an intimate and particularly desirable bond between the dielectric material and a metallic layer of nickel or copper can be achieved by the procedures set forth in U.S. Pat. No. 3,167,491 which procedures are incorporated herein by references and further description thereof omitted for brevity's sake.

The integral bond achieved by the electroplating procedures of the aforesaid U. S. Pat. No. 3,167,491 produces metal-dielectric interfaces at the two (or more) electrodes which are integral in a mechanical, thermal, and electrical sense, so as to completely eliminate high voltage corona effects normally present because of voids, air pockets, or foreign inclusions at those surfaces.

Figure 3:
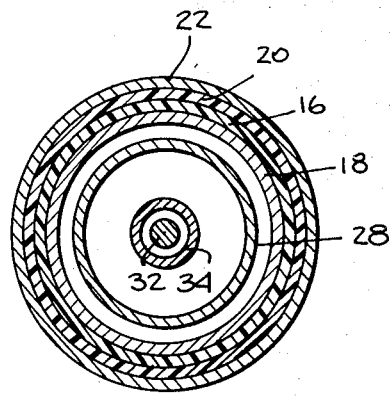
FIG. 3 is a sectional view taken along line 3—3, FIG. 2.

As shown in FIGS. 1–3, the capacitor elements 12 and 14 are concentrically arranged with the free or non-metallic faces of the dielectric elements 16 and 20 in sliding contact and are adapted for relative movement in the direction of the arrows FIG. 1 with the thickness of layers 16 and 20 being generally equal.

A contact flange 24 is secured as by soldering to one end of the metallic layer 22 and in electrical contact therewith. Another contact flange 26 is in electrical contact with the metallic layer 18 of element 12 through an internal brass sleeve 28 secured as by soldering to flange 26 at one end thereof and having a plurality of metallic pick-up fingers 30 secured as by soldering to the opposite end of sleeve 28. Pick-up fingers 30 contact the metallic layer 18 and thus provide electrical interconnection between metallic layer 18 and flange 26. Metallic contact or pick-up fingers 30 are commercially available from The Instrument Specialties Company, Inc., Little Falls, New Jersey, and further description thereof is omitted in the interests of brevity. Insulator ring 27 separates contact flange 26 physically and electrically from metallic layer 22 of capacitor element 14.

To achieve the desired relative movement of elements 12 and 14, there is provided a driving mechanism including a drive screw assembly 32 adapted for movement in and out of a sleeve element 34 concentrically arranged within the brass tubular member 28. Sleeve 34 is provided at one end with a threaded nut 33 adhered to sleeve 34 and adapted to receive screw assembly 32 for threaded travel therethrough. The upper end 36 of sleeve 34 is stepped and passes through an accommodating opening 29 in flange 28. The stem end 36 of sleeve 34 is locked in position by a suitable bushing 38.

To actuate the drive screw assembly 32, the end of drive screw 32 remote from sleeve 34 is also provided with a stem section 40 passing through a central aperture 42 in washer member 44. The stem 40 is threaded at its free end and adapted to receive an actuating screw 46 therein. In turn, washer member 44 is adhered as by any suitable means such as epoxy cement to element number 12 at one end of the metallic layer 18 as shown in FIG. 1.

As explained hereinabove, to vary the capacitance of capacitor 10, the capacitor sections 12 and 14 are moved relative to each other. To accomplish this relative movement screw 46 is suitably rotated. This in turn rotates drive screw 32 travelling it through threaded nut 33 and into and out of its accommodating sleeve 34. It will be understood that sleeve 34 being secured to contact flange 26 is stationary.

As drive screw 32 is moved into and out of sleeve 34 as desired, washer 44 secured to the end of driving screw 32 moves in like manner. Since washer 44 is in turn secured to section 12 the rotation of screw 46 will effect movement of section 12 back and forth in the direction of the arrows in FIG. 1, thereby moving the metallic layers 18 and 22 relative to each other to any desired relative position. Thus, the capacitance of the capacitor 10 can be selectively varied by rotation of screw 46 positioning capacitor elements 12 and 14 as desired in accordance with the selected capacitance.

It will be understood, however, that other suitable means may be employed to achieve the relative movement of capacitor elements 12 and 14 without departing from the essence of the present invention.

In a typical construction, capacitor elements, such as elements 12 and 14, having a polytetrafluoroethylene layer of approximately 0.093 inch thickness and 0.010 inch copper layer plated thereto have been used successfully in the construction of a capacitor approximately 2.5 inches in retracted length and 2 inches in outer diameter with a variable capacitance of 10 picofarads to 50 picofarads and a working voltage of 10 kilovolts with a current carry capability of approximately 40 amperes rms.

Figure 4:
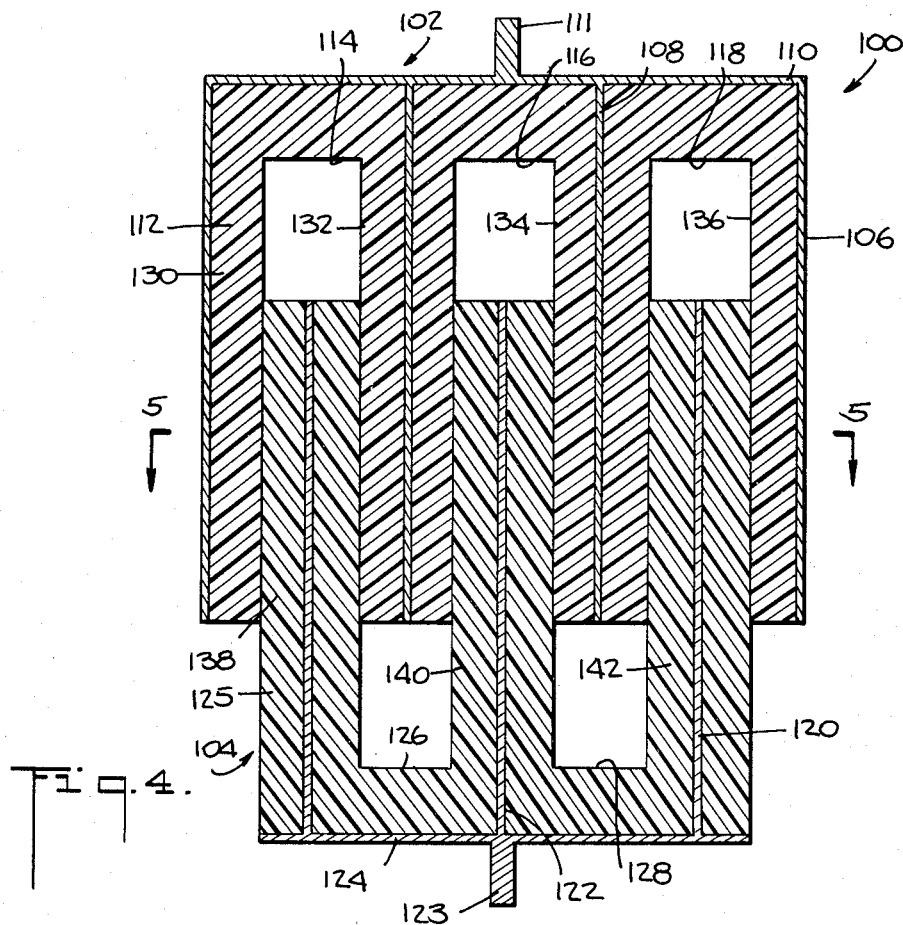
FIG. 4 is a cross-sectional schematic view of another form of the invention.
Figure 5:
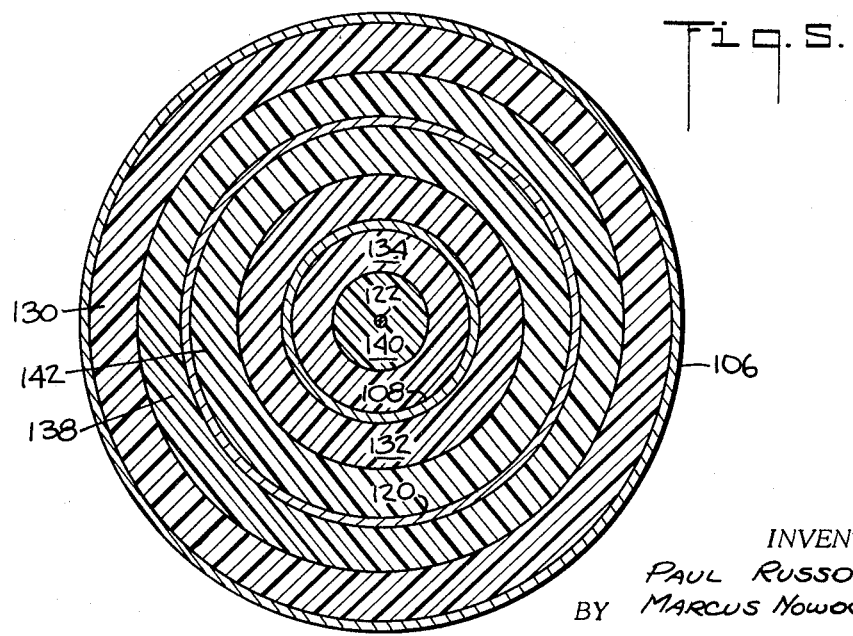
FIG. 5 is a cross-sectional view taken along line 5—5, FIG. 4.

FIGS. 4 and 5 illustrate another form of the invention wherein the capacitor includes a plurality of electrodes, preferably tubular or cylindrical in configuration. Turning to FIGS. 4 and 5, capacitor 100 shown therein is comprised of capacitor sections 102 and 104. Section 102 has an outer metallic layer or electrode 106 and an interior electrode 108, which are preferably tubular or cylindrical in configuration and electrically interconnected by end metallic layer or capacitor 110. Capacitor 110 is furnished with a connector unit 111.

The interior surfaces of electrode 106 and capacitor 110 as well as both surfaces of interior electrode 108 are provided with a layer of dielectric material 112 which is preferably self-lubricating plastic material such as polytetrafluoroethylene. The metallic layers and dielectric layers in this embodiment are secured as previously described hereinabove.

As will be noted, section 102 has a plurality of accommodating openings 114, 116, and 118 formed therein. Openings 114, 116 and 118 are adapted to receive therein associated portions of capacitor section 104.

Section 104, in turn, is provided with a metallic layer or electrode 120, tubular in form, and a second generally-tubular electrode 122 disposed interiorly of electrode 120. Electrodes 120 and 122 are electrically interconnected by a metallic layer or end cap 124. Cap 124 is also provided with a connector unit 123.

The interior surface of end cap 124 as well as both surfaces of electrodes 120 and 122 are also provided with a layer 125 of dielectric material, such as polytetrafluoroethylene. Section 104 is likewise provided with a plurality of accommodating openings 126 and 128.

As shown in FIG. 4, section 102 is thus formed with portions 130, 132, 134 and 136 extending generally at right angles to end cap 110 with portions 132 and 134 received in openings 126 and 128 of section 104. Likewise, section 104 is formed with portions 138, 140 and 142 extending generally at right angles to end cap 124 with portions 138, 140 and 142 received in openings 114, 116 and 118 of section 102.

As will be noted, the dielectric layers 112 and 125 on the adjacent portions of sections 102 and 104 are in sliding contact and sections 102 and 104 are adapted to be moved relative to each other by a suitable means such as that illustrated with respect to the embodiment shown in FIGS. 1–3 to selectively vary the capacitance of capacitor 100 in accordance with the teachings of the present invention.

Having described the invention with reference to presently preferred embodiments thereof, it will be understood by those skilled in the art that various changes in construction may be made therein without departing from the true spirit of the invention as defined in the appended claims.

What is claimed is:

1. In a variable capacitor, the combination of at least one pair of tubular-shaped and concentrically disposed contiguous capacitor elements, each of said elements including a metallic layer and a generally coextensive layer of self-lubricating dielectric material, means securing said metallic layer to said dielectric material, the outermost dielectric face of the inner element in contact with the innermost dielectric face of the outer element, means mounting said capacitor elements in contiguous relationship for free relative movement along their major axes with the dielectric layers of said capacitor elements in adjacent but freely movable contact and means for moving said capacitor elements axially relative to each other whereby the self-lubricating nature of said dielectric elements facilitates movement of said capacitor elements for selectively varying the capacitance of said capacitor.

2. The combination of claim 1 wherein said dielectric material is polytetrafluoroethylene and the metallic layer is copper electroplated onto said polytetrafluoroethylene.

3. The capacitor of claim 1 including a pair of opposed, stationary contact flanges, one of said contact flanges electrically connected to the metallic layer on the outer, stationary capacitor element and pickup means on said other contact flange in electrical contact with the metallic layer on the inner capacitor element at any point along the path of travel thereof.

4. A variable capacitor comprising at least one pair of tubular-shaped and concentrically disposed contiguous capacitor elements each of said elements including a copper layer and a layer of polytetrafluoroethylene material, said copper layer being electroplated to and generally coextensive with its associated layer of polytetrafluoroethylene, the layers of polytetrafluoroethylene material on contiguous capacitor elements are of generally equal thickness, means mounting said capacitor elements in contiguous relationship for relative movement along their major axes with the polytetrafluoroethylene layers of said capacitor elements in adjacent but freely movable contact, and means for moving said capacitor elements axially relative to each other whereby the capacitance of said capacitor may be selectively varied.

5. The capacitor of claim 1 including a pair of opposed, stationary contact flanges, one of said contact flanges electrically connected to the metallic layer on the outer, stationary capacitor element and pickup means on said other contact flange in electrical contact with the metallic layer on the inner capacitor element at any point along the path of travel thereof.

6. The capacitor of claim 4 including at least two pair of capacitor elements.

7. A variable capacitor comprising at least one pair of contiguous capacitor elements, each of said elements including a metallic layer, a generally coextensive layer of dielectric material, the layers of said dielectric material of each of said capacitor elements being of substantially equal thickness, and means securing said metallic layer to said dielectric material, means mounting said capacitor elements in contiguous relationship for free relative movement with the dielectric layers of said capacitor elements in adjacent but freely movable contact, and means for moving said capacitor elements to selectively vary the capacitance of said capacitor in a translatory direction relative to each other along a plane substantially midway between said metallic elements where the electric charge density is at a minimum.

* * * * *

UNITED STATES PATENT OFFICE
CERTIFICATE OF CORRECTION

Patent No. 3,675,093                     Dated July 4, 1972

Inventor(s) Paul Russo and Markus Nowogrodzki

It is certified that error appears in the above-identified patent and that said Letters Patent are hereby corrected as shown below:

In the Title Page - under "Inventors" change "Mowogrozki" to --Nowogrodzki--

Signed and sealed this 14th day of November 1972.

(SEAL)
Attest:

EDWARD M. FLETCHER, JR.
Attesting Officer

ROBERT GOTTSCHALK
Commissioner of Patents